(12) United States Patent
Pedersen

(10) Patent No.: US 6,793,186 B2
(45) Date of Patent: Sep. 21, 2004

(54) CLAMP FOR A CROSS BAR

(75) Inventor: Magnus E. Pedersen, Alingsas (SE)

(73) Assignee: JAC Products Inc., Saline, MI (US)

( * ) Notice: Subject to any disclaimer, the term of this patent is extended or adjusted under 35 U.S.C. 154(b) by 0 days.

(21) Appl. No.: 10/259,205

(22) Filed: Sep. 27, 2002

(65) Prior Publication Data

US 2003/0075651 A1 Apr. 24, 2003

Related U.S. Application Data

(63) Continuation-in-part of application No. 09/865,237, filed on May 25, 2001, now Pat. No. 6,568,644.

(51) Int. Cl.$^7$ .............................................. B60R 9/04
(52) U.S. Cl. .......................... 248/229.18; 248/316.5; 248/309; 224/315; 224/319
(58) Field of Search ................... 248/229.13, 229.23, 248/231.51, 316.5; 224/309, 315, 319, 321, 326, 329, 331, 448, 451, 545; 24/270, 514, 515

(56) References Cited

U.S. PATENT DOCUMENTS

| | | | | |
|---|---|---|---|---|
| 320,995 A | * | 6/1885 | Atkinson | 223/100 |
| 1,004,722 A | * | 10/1911 | Baldwin | 280/11 |
| 1,444,004 A | * | 2/1923 | Novick | 493/130 |
| 1,468,823 A | * | 9/1923 | Massuger et al. | 292/96 |
| 1,983,670 A | * | 12/1934 | Knight | 248/228.3 |
| 2,455,141 A | * | 11/1948 | Runge | 248/74.1 |
| 2,483,012 A | * | 9/1949 | Koon | 248/515 |
| 2,776,495 A | * | 1/1957 | Dickey | 33/371 |
| 2,876,027 A | * | 3/1959 | Sulmonetti | 403/53 |
| 2,995,332 A | * | 8/1961 | Davis | 251/5 |
| 3,601,295 A | * | 8/1971 | Lowe | 224/42.38 |
| 4,179,148 A | * | 12/1979 | Johnson | 294/82.11 |
| 4,301,982 A | * | 11/1981 | Tiemann | 244/17.11 |
| 4,445,657 A | * | 5/1984 | Breckenridge | 248/73 |
| 4,736,878 A | * | 4/1988 | Rasor | 224/321 |
| 4,886,237 A | * | 12/1989 | Dennis | 248/289.11 |
| 5,114,060 A | * | 5/1992 | Boyer | 224/413 |
| 5,400,900 A | * | 3/1995 | Myers et al. | 206/289 |
| 5,456,396 A | * | 10/1995 | Allen | 224/321 |
| 5,556,221 A | * | 9/1996 | Brunner | 403/322.4 |
| 5,730,343 A | * | 3/1998 | Settelmayer | 224/321 |
| 5,769,292 A | * | 6/1998 | Cucheran et al. | 224/324 |
| 5,779,119 A | * | 7/1998 | Talbot et al. | 224/427 |
| 6,439,526 B1 | * | 8/2002 | London | 248/316.5 |
| 6,568,644 B2 | * | 5/2003 | Pedersen | 248/229.13 |
| 2002/0125282 A1 | | 9/2002 | Laverack et al. | |

FOREIGN PATENT DOCUMENTS

| | | | |
|---|---|---|---|
| DE | 20016839 U1 | 1/2001 | |
| EP | 1008490 A1 | 6/2000 | |

OTHER PUBLICATIONS

Search report issued Jan. 2, 2004 for corresponding British Application No. GB 0315417.6.

* cited by examiner

Primary Examiner—Kimberly Wood
(74) Attorney, Agent, or Firm—Harness Dickey & Pierce P.L.C.

(57) ABSTRACT

A clamp for use with a cross bar of an existing vehicle article carrier to allow accessory vehicle article carrier components to be secured to the cross bar. The clamp includes a base portion and a clamp element hingedly coupled to the base portion. A locking assembly allows the clamp element to be secured to the base portion without any external tools. The locking assembly includes an over-center locking lever which can be pretightened before being moved from an unlatched into a latched position to thus allow a pretightening force to be applied to the clamp element. The clamp element also includes a C-shaped channel for receiving a tap plate or other similar component associated with an accessory article carrier component.

16 Claims, 5 Drawing Sheets

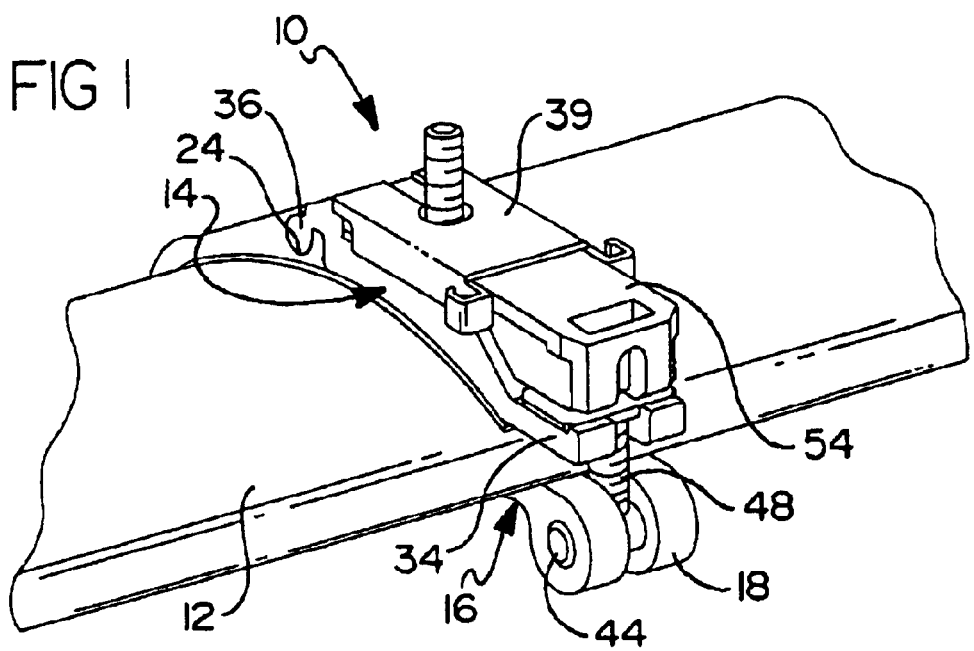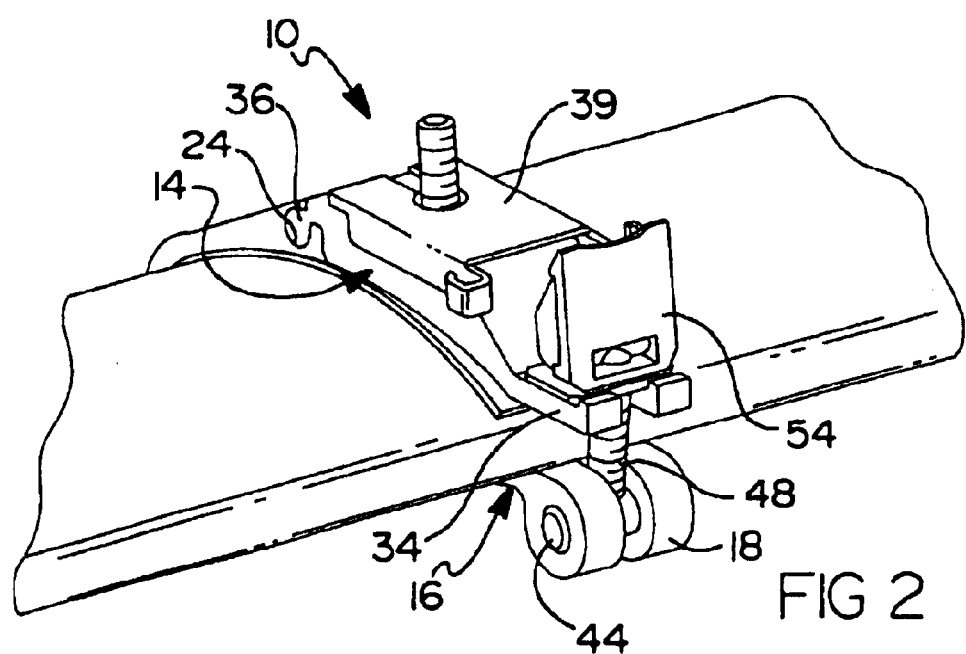

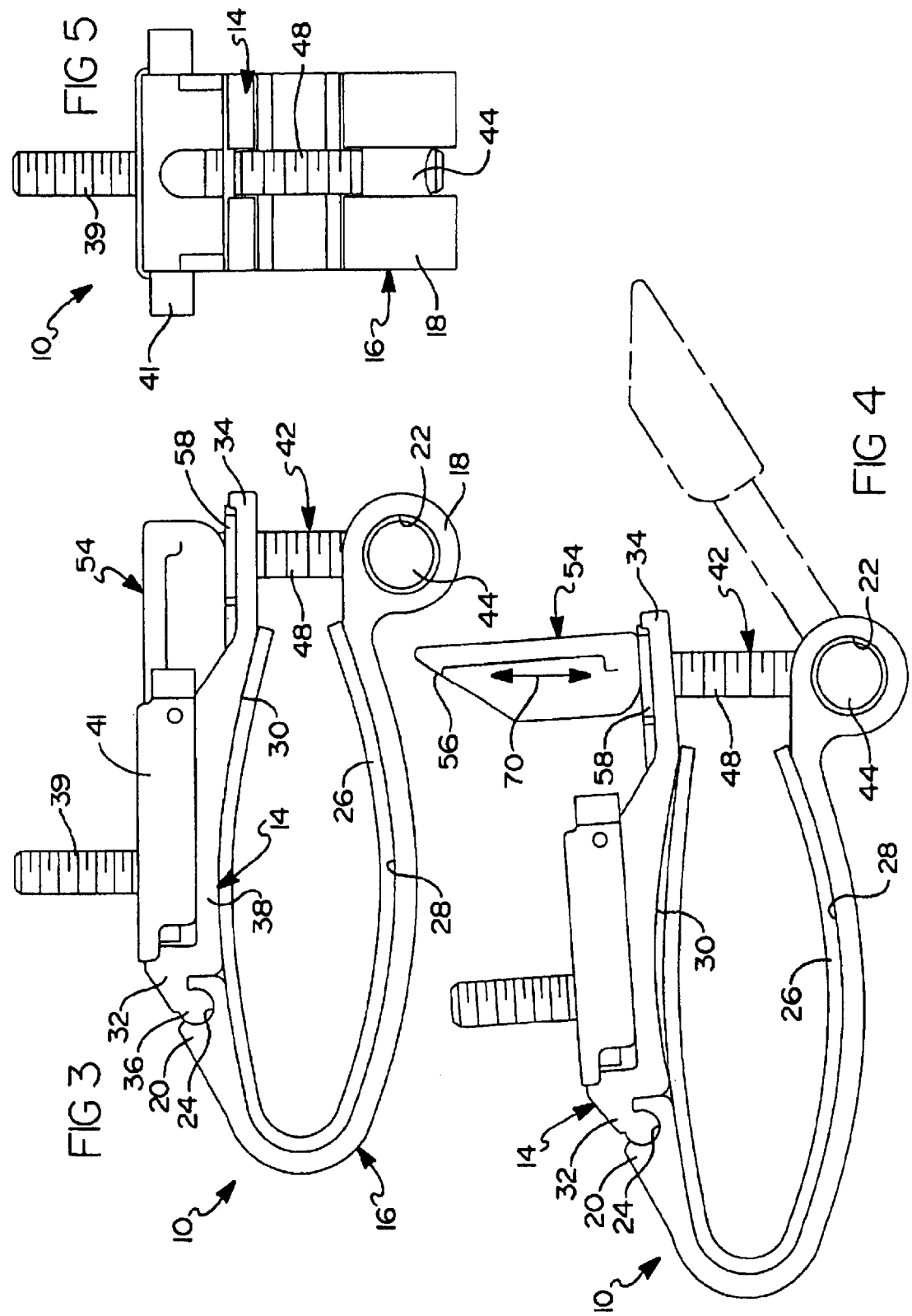

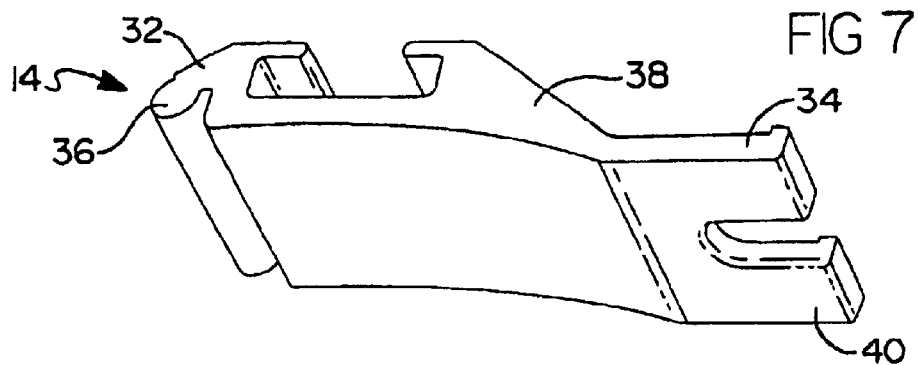
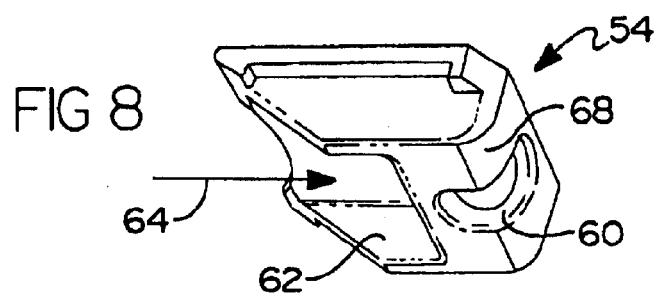
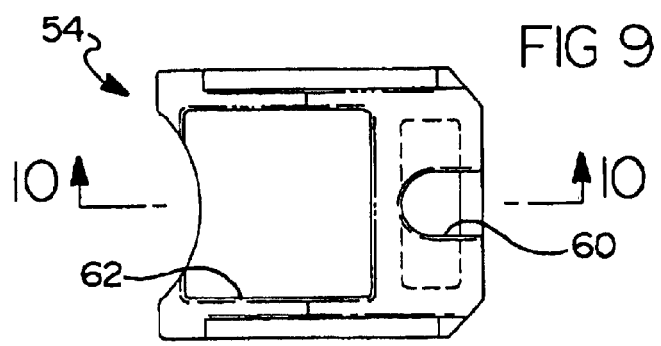
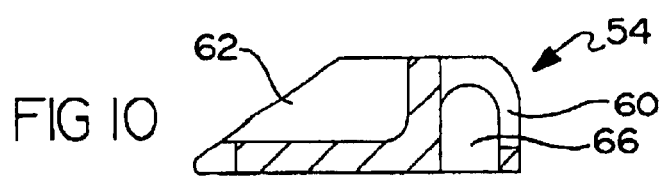

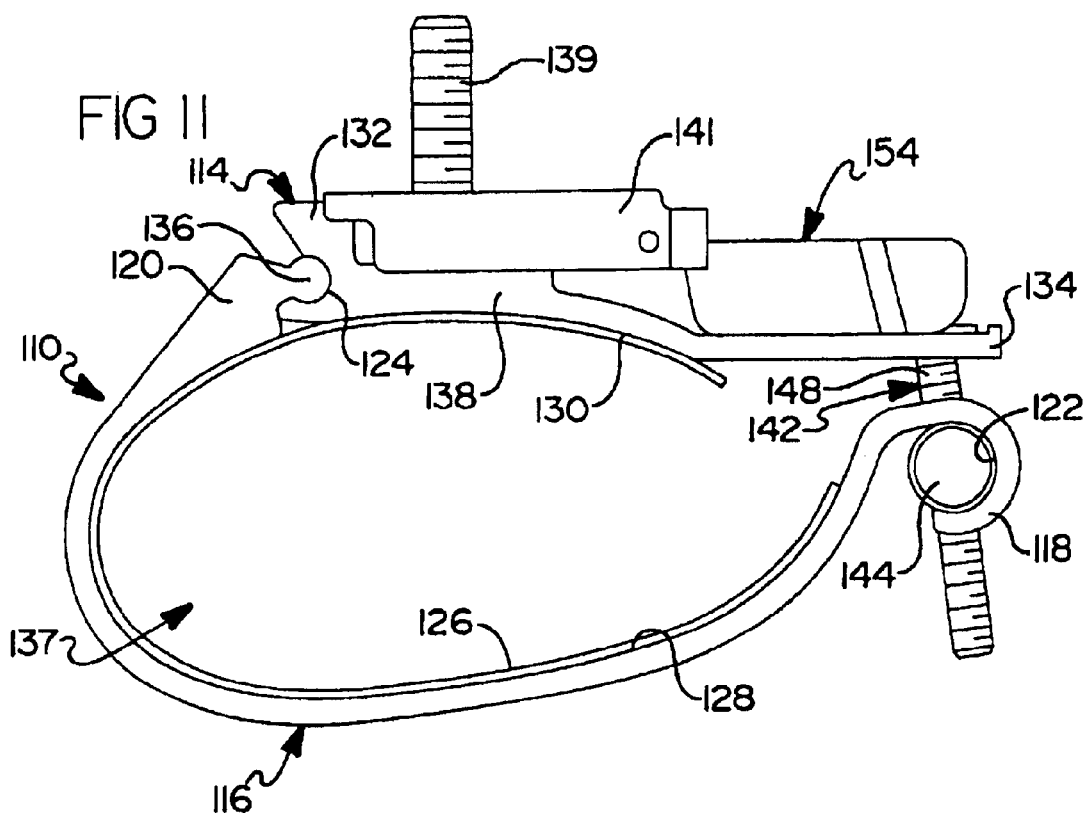
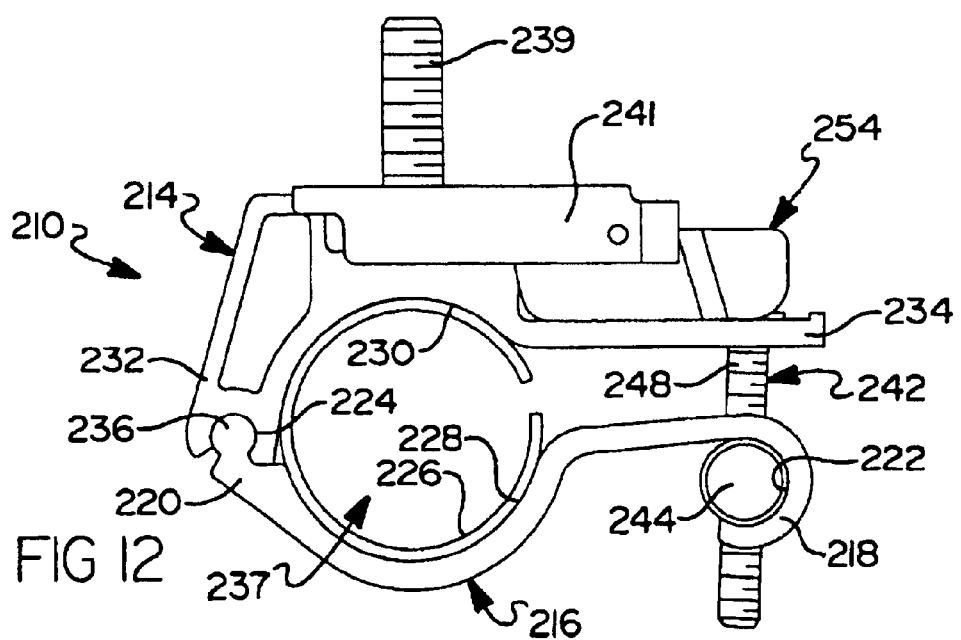

US 6,793,186 B2

CLAMP FOR A CROSS BAR

CROSS-REFERENCE TO RELATED APPLICATIONS

This application is a continuation-in-part of U.S. patent application Ser. No. 09/865,237 filed on May 25, 2001. The disclosure of the above application is incorporated herein by reference.

FIELD OF THE INVENTION

The present invention relates to clamps, and more particularly to a clamp for use with a cross bar of a vehicle article carrier to provide a means for article carrier accessories such as bicycle racks to be secured to a cross bar of an existing vehicle article carrier.

BACKGROUND OF THE INVENTION

Vehicle article carriers are used in a wide variety of applications to allow luggage and other articles to be transported above an outer body surface of a vehicle. Typically, such vehicle article carriers include a pair of slats or support rails disposed parallel to one another along a major longitudinal axis of the vehicle. One or more cross bars may be fixedly or movably supported on the side rails or slats. Articles can be secured directly to the cross bars via bunge cords, straps or other like components.

When using specific accessory attachments such as a bicycle supporting rack, however, it is not always easy to secure the accessory component to the cross bar (or cross bars) without requiring some disassembly of the existing vehicle article carrier or the use of complex and costly attachment hardware. It would therefore be highly desirable to provide some form of clamp assembly which can be used to easily secure a variety of accessory attachments to a cross bar of an existing vehicle article carrier without requiring disassembly of any component of the vehicle article carrier. It would further be highly desirable to provide such a clamp that can be quickly and easily removed from the cross bar when it is not needed. Still further, it would be highly desirable to provide such a clamp that does not significantly detract from the aesthetic appeal of the existing vehicle article carrier.

SUMMARY OF THE INVENTION

The present invention relates to a clamp which is specifically adapted to engage a cross bar of an existing vehicle article carrier to allow accessory article carrier components or attachments to be secured to and supported on the cross bar. The clamp includes a base portion having a coupling portion and a hinge portion. A locking assembly is pivotally secured to the coupling portion. A clamp element having a first end and a second end is pivotally secured at the first end to the hinge portion of the base portion to form an aperture between the base portion and the clamp portion. The aperture may be of various different shapes and sizes. In one preferred embodiment the aperture is oval shaped. In another preferred embodiment the aperture has a modified oval shape. In yet another preferred embodiment the aperture is circular.

When the clamp is to be attached to a cross bar, the locking assembly is pivoted away from the clamp element and the clamp element is pivoted into an open position to allow the base portion and the clamp element to be slid over the cross bar. The locking assembly is then rotated into a locked position where it engages with the second end of the clamp element. An over-center locking lever carried by the locking assembly is pivoted from an unlatched position into a latched position relative to the clamp element, thus clamping the base portion and clamp element over the cross bar.

The clamp element of the present invention includes an accessory attachment portion which in one preferred embodiment forms a C-shaped channel to which accessory article carrier components can be attached once the clamp is secured to the cross bar. Thus, other rails or tie-down elements can be secured to the clamp and thus supported from the existing cross bar to which the clamp is secured.

In the preferred embodiments the locking assembly includes a T-shaped stud having a threaded portion. The threaded portion is engaged with a threaded aperture of a barrel member which is disposed within the coupling portion of the base portion. The over-center locking lever is secured to a head portion of the T-shaped stud and can be rotated to cause the stud to threadably advance within the threaded aperture of the barrel member. This allows the over-center locking lever to pretighten the clamp element to the base portion prior to urging the over-center locking lever from its unlatched into its latched position.

In the preferred embodiments a resilient pad or other like element is secured to an inner surface of the base portion and has a length sufficient to extend along an interior surface of the clamp element. The resilient pad thus substantially circumscribes the cross bar when the clamp is secured to the cross bar.

Further areas of applicability of the present invention will become apparent from the detailed description provided hereinafter. It should be understood that the detailed description and specific examples are intended for purposes of illustration only and are not, intended to limit the scope of the invention.

BRIEF DESCRIPTION OF THE DRAWINGS

The present invention will become more fully understood from the detailed description and the accompanying drawings, wherein:

FIG. 1 is a perspective view of the clamp attached to a portion of a cross bar of a vehicle article carrier;

FIG. 2 is a perspective view of the clamp in an open position able to be removed from the cross bar;

FIG. 3 is a side view of just the clamp in its locked position, the clamp having an oval aperture;

FIG. 4 is a side view of the clamp with the over-center locking lever in its open position;

FIG. 5 is an end view of the clamp taken in accordance with directional arrow 5 in FIG. 3;

FIG. 7 is a perspective view of just the clamp element;

FIG. 8 is a perspective view of the over-center locking lever;

FIG. 9 is a plan view of the bottom surface of the over-center locking lever of FIG. 8;

FIG. 10 is a cross sectional side view of the locking lever of FIG. 8 taken in accordance with section line 10—10 in FIG. 9;

FIG. 11 is a side view of the clamp according to an additional preferred embodiment, the clamp having a modified oval aperture and illustrated in its locked position; and FIG. 12 is a side view of the clamp according to yet another preferred embodiment, the clamp having a circular aperture and illustrated in its locked position.

DETAILED DESCRIPTION OF THE PREFERRED EMBODIMENTS

Figure 6:
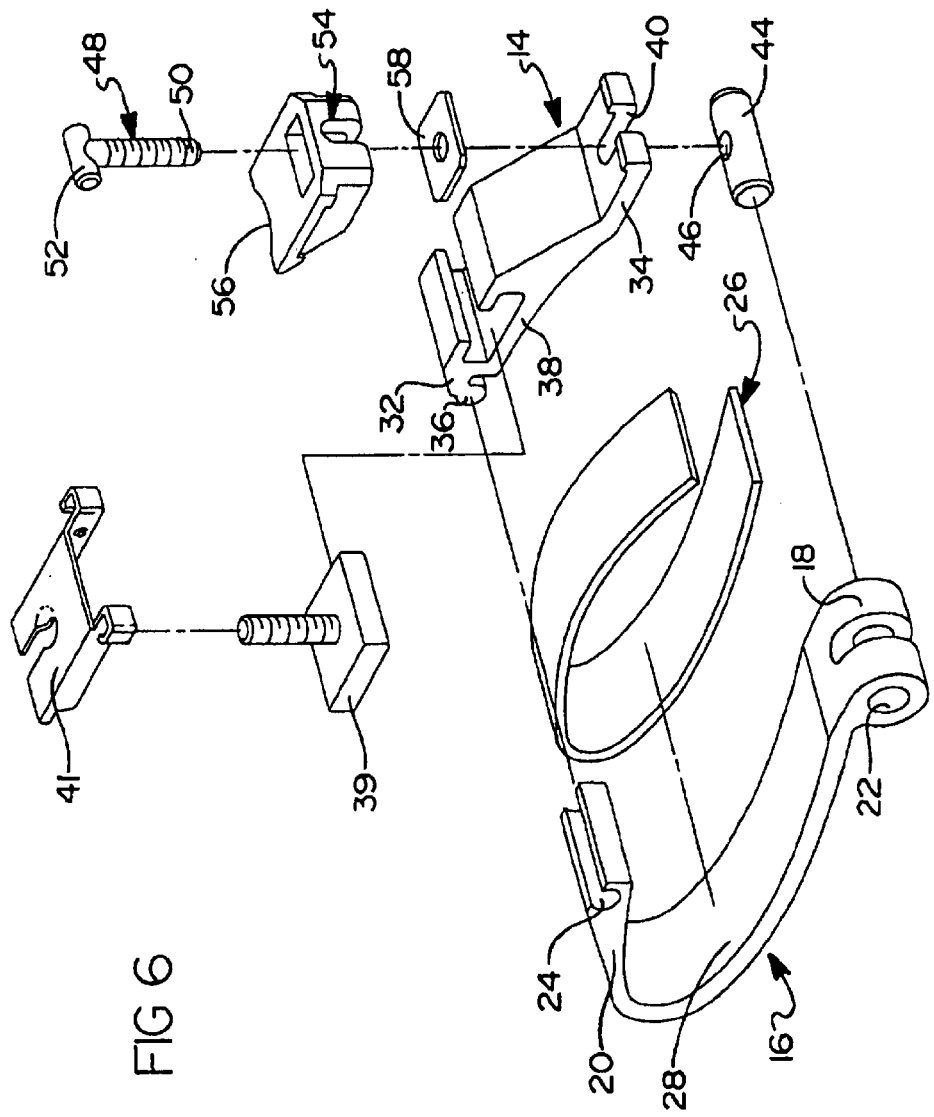
FIG. 6 is an exploded perspective view of the various components of the clamp.

The following description of the preferred embodiment(s) is merely exemplary in nature and is in no way intended to limit the invention, its application, or uses.

Referring to FIGS. 1 and 2, there is shown a clamp 10 secured to a portion of an existing cross bar 12 of a vehicle article carrier. The clamp 10 is used to support accessory article carrier components such as bicycle carrier rails to the cross bar 12. In this regard it will be appreciated that in many, if not most, applications, a pair of the clamps 10 will be used on each cross bar 12 and spaced apart as needed to accommodate the accessory article carrier component.

With reference to FIGS. 3–6, the clamp 10 includes a clamp element 14 and a base portion 16. With specific reference to FIG. 3, the base portion 16 includes a coupling portion 18 and a hinge portion 20. The coupling portion 18 forms an enlarged yoke-type component (FIG. 5) having a bore 22 that is preferably cylindrical. The hinge portion 20 forms a semi-cylindrical slot 24. A resilient member such as a pad 26 is preferably secured to an inner surface 28 of the base portion 16. The resilient member 26 preferably has a length sufficient to extend underneath an inner surface 30 of the clamp element 14. The resilient member 26 thus substantially circumscribes the cross bar 12 when the clamp 10 is secured to the cross bar. This serves to protect the cross bar 12 from scratches and to further help eliminate any possibility of slippage of the clamp 10 on the cross bar when the clamp is locked onto the cross bar.

The clamp element 14 also includes a first end 32 and a second end 34. The first end 32 includes a cylindrical edge portion 36 which fits within slot 24 and allows the clamp element 14 to rotate about the hinge portion 20. Preferably, the clamp element 14 and base portion 16 form an oval aperture 37 when the edge portion 36 is seated within the slot 24. The clamp element 14 further includes an accessory attachment portion 38 (best seen in FIGS. 6 and 7) which in one preferred form comprises a C-shaped channel for allowing a conventional tap plate 39 or other similar component to be secured thereto. The tap plate 39 or like component is then used to interface with the accessory article carrier component to allow the accessory article carrier component to be secured to the clamp 10. If a tap plate is incorporated, then a retaining clip 41 can also be used to hold the tap plate 39 to the clamp element 14. However, it will be appreciated that the retaining clip 41 is optional, even though it is illustrated as a part of the clamp 10.

With further reference to FIGS. 2, 3 and 6, the clamp element 14 includes a notch 40 (FIG. 6) which can be engaged with a locking assembly 42 to allow the clamp element to be held in a clamped position relative to the base portion 16. The locking assembly 42 generally comprises a barrel member 44 having a threaded aperture 46. A T-shaped stud 48 has a lower threaded end 50 which engages with the threaded aperture 46 of the barrel member 44. The T-shaped stud 48 further includes a head portion 52 which engages with an over-center locking lever 54. The locking lever 54 can be urged between the latched position shown in FIG. 3 and the unlatched position shown in FIG. 4 by lifting or pushing an edge 56 thereof in the desired direction. Preferably a lockwasher 58 or other like biasing element is used to further provide a tight latching action when the locking lever 54 is moved into its latched position.

Referring to FIGS. 6 and 8–10, the over-center locking lever 54 is shown in greater detail. The locking lever 54 includes a cutout 60 which is in communication with a slot 62. The T-shaped stud 48 is assembled to the locking lever 54 by inserting the threaded portion 50 of the stud 48 into the slot 62, in accordance with directional arrow 64 in FIG. 8, and through cutout 60. The head portion 52 of the stud 48 rests within a pocket 66 (FIG. 10). The locking lever 54 is therefore able to move rotationally about the head portion 52 through an arc defined by the cutout 60. A camming surface 68 and the location of the pocket 66 allows an over-center locking action to be effected when the locking lever 54 is in the latched position of FIG. 3. The locking lever 54 can also be rotated to threadably advance the threaded portion 50 within threaded aperture 46 of the barrel member 44, thus allowing a pretightening force to be applied prior to urging the locking lever 54 into its latched position.

In operation, the user first rotates the locking assembly 42 to the position shown in FIG. 2 and then orientates the clamp element 14 and the base portion 16 of the clamp 10 over the cross bar 12. The clamp element 14 is then moved into a locked position resting against an outer surface of the cross bar 12. The locking assembly 42 is then rotated such that the threaded portion 50 of the T-shaped stud 48 engages with the notch 40. The locking lever 54 is then rotated about longitudinal axis 70 shown in FIG. 4 to apply a pretightening force by drawing the clamp element 14 and base portion 16 into contact with the cross bar 12. The over-center locking lever 54 is then rotated from its unlatched position (FIG. 4) to its latched position (FIG. 3). The accessory attachment component can then be secured to the tap plate 39 or the C-shaped channel of the accessory attachment portion 38.

The clamp element 14 and base portion 16 may be formed from a variety of materials but are preferably formed from aluminum or another suitably high strength material. The resilient member 26 may be formed from rubber or any other suitably resilient material. A clamp 10 can be quickly and easily removed without any external tools from the cross bar 12 when not needed and does not detract from the aesthetic appeal of the cross bar or otherwise significantly interfere with use of the cross bar even when left in place attached to the cross bar.

FIG. 11 illustrates a clamp 110 according to an additional preferred embodiment. As clamp 110 is similar to clamp 10, clamp 110 is described below using many of the reference numbers of clamp 10 increased by 100.

Clamp 110 includes a clamp element 114 and a base portion 116. The base portion 116 includes a coupling portion 118 and a hinge portion 120. The coupling portion 118 forms an enlarged yoke-type component having a bore 122 that is preferably semi-circular as illustrated, but may also be circular. The hinge portion 120 forms a cylindrical edge portion 136. A resilient member such as a pad 126 is preferably secured to an inner surface 128 of the base portion 116. The resilient member 126 preferably has a length sufficient to extend underneath an inner surface 130 of the clamp element 114. The resilient member 126 thus substantially circumscribes the cross bar 12 when the clamp 110 is secured to the cross bar 12. This serves to protect the cross bar 12 from scratches and to further eliminate any possibility of slippage of the clamp 110 on the cross bar when the clamp is locked onto the cross bar 12.

The clamp element 114 also includes a first end 132 and a second end 134. The first end 132 includes a semi-cylindrical slot 124 that receives cylindrical edge portion 136 and allows the clamp element 114 to rotate about the hinge portion 120. Preferably, the clamp element 114 and base portion 116 form a modified oval aperture 137 when the cylindrical edge portion 136 is seated within the semi-cylindrical slot 124. It must be appreciated that the orientation of semi-circular slot 124 and edge portion 136 may be reversed so that cylindrical edge portion 136 is located upon the clamp element 114 and semi-cylindrical slot 124 is located upon the hinge portion 120.

Like clamp 10, clamp 110 also includes an accessory attachment portion 138, a tap plate 139, a retaining clip 141, a locking assembly 142, a barrel member 144, a T-shaped stud 148, a locking lever 154, and an optional lockwasher (not shown). A detailed discussion of these elements is not necessary as they are identical to those of clamp 10. Further, a detailed discussion of the operation of clamp 110 is not required as its operation is identical to the operation of clamp 10 described above.

FIG. 12 illustrates a clamp 210 according to a further preferred embodiment of the present invention. As clamp 210 is similar to clamp 10, clamp 210 is described below using many of the reference numbers of clamp 10 increased by 200.

Clamp 210 includes a clamp element 214 and a base portion 216. The base portion 216 includes a coupling portion 218 and a hinge portion 220. The coupling portion 218 forms an enlarged yoke-type component having a bore 222 that is preferably semi-circular as illustrated, but may also be circular. The hinge portion 220 forms a cylindrical edge portion 236. A resilient member such as a pad 226 is preferably secured to an inner surface 228 of the base portion 216. The resilient member 226 preferably has a length sufficient to extend underneath an inner surface 230 of the clamp element 214. The resilient member 226 thus substantially circumscribes the cross bar 12 when the clamp 210 is secured to the cross bar 12. This serves to protect the cross bar 12 from scratches and to further eliminate any possibility of slippage of the clamp 210 on the cross bar 12 when the clamp is locked onto the cross bar 12.

The clamp element 214 also includes a first end 232 and a second end 234. The first end 232 includes a semi-cylindrical slot 224 that receives cylindrical edge portion 236 and allows the clamp element 214 to rotate about the hinge portion 220. Preferably, the clamp element 214 and base portion 216 form a cylindrical aperture 237 when the cylindrical edge portion 236 is seated within the semi-cylindrical slot 224. It must be appreciated that the orientation of semi-circular slot 224 and edge portion 236 may be reversed so that cylindrical edge portion 236 is located upon the clamp element 214 and semi-cylindrical slot 224 is located upon the hinge portion 220.

Like clamp 10, clamp 210 also includes an accessory attachment portion 238, a tap plate 239, a retaining clip 241, a locking assembly 242, a barrel member 244, a T-shaped stud 248, a locking lever 254, and an optional lockwasher (not shown). A detailed discussion of these elements is not necessary as they are identical to those of clamp 10. Further, a detailed discussion of the operation of clamp 210 is not required as its operation is identical to the operation of clamp 10 described above.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An adjustable clamp for use with a cross bar of a vehicle article carrier to enable accessory article carrier components to be secured to said cross bar, said clamp comprising:

a base portion having a coupling portion and hinge portion;

a clamp element having a first end and a second end, said first end being hingedly coupled to said hinge portion;

said clamp element having an accessory attachment portion formed between said first end and said second end said accessory attachment portion adapted to couple to an external article carrier component;

a locking assembly secured to said coupling portion of said base portion, said locking assembly including an over-center locking lever adapted to be rotated between a non-locking position and a locking position about said coupling portion of said base portion, said locking lever further being rotatable between an unlatched position and a latched position;

said clamp element being movable pivotally about said first end away from said base portion into an open position to allow said clamp to be placed over said cross bar, and also into a clamping position disposed against a surface of said cross bar, wherein said second end can be engaged by said locking assembly;

once said locking assembly is in said locking position engaged with said second end of said clamp element, said over-center locking lever is movable from said unlatched position to said latched position to clampingly secure said second end of said clamp element tightly and said base portion over said cross bar; and wherein said base and said clamp elements cooperatively form at least one of an oval shaped aperture, a modified oval shaped aperture, and a circular shaped aperture.

2. The clamp of claim 1, wherein said coupling portion comprises a cylindrical bore; and wherein said locking assembly comprises a barrel member having a threaded aperture slidably and being disposed within said cylindrical bore.

3. The clamp of claim 2, wherein said locking assembly further comprises a T-shaped locking stud having a threaded end, said threaded end being secured to said threaded aperture of said barrel member.

4. The clamp of claim 3, wherein said over-center locking lever is coupled to a T-shaped head portion of said T-shaped locking stud for rotating said T-shaped locking stud.

5. The clamp of claim 4, wherein said second end of said clamp element includes a notch for engaging with said T-shaped locking stud, said over-center locking lever resting over said second end when said locking assembly is rotated into said locking position; and wherein said over-center locking lever can used to pre-tighten said clamp element against said cross bar prior to said over-center locking lever being moved into said latched position.

6. The clamp of claim 1, further comprising a resilient pad secured to an inside surface of said base portion.

7. The clamp of claim 1, further comprising a resilient, elongated pad disposed along an interior surface of said base portion and being sufficient in length to extend along an inside surface of said clamp element, to thereby substantially circumscribe an exterior surface of said cross bar and protect said exterior surface when said clamp is clamped to said cross bar.

8. The clamp of claim 1, wherein said clamp element includes an accessory attachment portion for enabling said accessory article carrier components to be secured to said clamp element.

9. An adjustable clamp for use with a cross bar of a vehicle article carrier to enable accessory article carrier components to be secured to said cross bar, said clamp comprising:

a base portion having a coupling portion and hinge portion;

a clamp element having a first end and a second end, said first end being hingedly coupled to said hinge portion;

said clamp element having an accessory attachment portion formed between said first end and said second end said accessory attachment portion adapted to couple to an external article carrier component;

a locking assembly including:
    a stud assembly pivotally secured to said coupling portion of said base portion, said stud assembly being movable rotationally between an unlocked position and a locked position; and
    an over-center locking lever adapted to be rotated between an unlatched position and a latched position;

said clamp element being movable pivotally about said first end away from said base portion into an open position to allow said clamp to be placed over said cross bar, and also into a clamping position disposed against a surface of said cross bar, wherein said second end thereof can be engaged a portion of said over-center locking lever;

once said locking assembly is in said locked position engaged with said second end of said clamp element, said over-center locking lever can be moved from said unlatched position to said latched position to clampingly secure said second end of said clamp element tightly over said cross bar; and wherein said base and said clamp elements cooperatively form at least one of an oval shaped aperture, a modified oval shaped aperture and a circular shaped aperture.

10. The clamp of claim 9, wherein said stud assembly comprises a T-shaped stud having a threaded end portion, and an independent barrel member having a threaded aperture for engaging with said threaded end portion of said T-shaped stud;

wherein said coupling portion includes a cylindrical bore; and wherein said barrel member is disposed within said cylindrical bore.

11. The clamp of claim 9, further comprising a resilient member secured to an inner surface of said base portion.

12. The clamp of claim 9, further comprising a resilient member secured to an inner surface of said base portion and having a length sufficient to substantially circumscribe said cross bar when said clamp is clamped to said cross bar.

13. The clamp of claim 9, wherein said first end of said clamp element includes a shoulder portion for limiting rotational movement of said clamp element.

14. The clamp of claim 9, wherein said clamp element includes an accessory attachment portion for enabling said accessory article carrier components to be attached to said clamp.

15. An adjustable clamp for use with a cross bar of a vehicle article carrier to enable accessory article carrier components to be secured to said cross bar, said clamp comprising:

a base portion having a coupling portion and hinge portion;

a clamp element having a first end and a second end, said first end being hingedly coupled to said hinge portion, and an accessory attachment portion formed in between said first and second ends;

a locking assembly including:
    a stud assembly pivotally secured to said coupling portion of said base portion, said stud assembly being movable rotationally between an unlocked position and a locked position; and
    said stud assembly including a barrel member having a threaded aperture and a T-shaped stud having a threaded end portion engageable with said threaded aperture;
    an over-center locking lever coupled to said T-shaped stud and adapted to be rotated between an unlatched position and a latched position, and further operable to be rotated so as to pretighten said over-center locking lever against said second end of said clamp element;

said clamp element being movable pivotally about said first end away from said base portion into an open position to allow said clamp to be placed over said cross bar, and also into a clamping position disposed against a surface of said cross bar, wherein said second end thereof can be engaged a portion of said over-center locking lever;

once said locking assembly is in said locked position engaged with said second end of said clamp element, said over-center locking lever can be moved from said unlatched position to said latched position to clampingly secure said second end of said clamp element tightly over said cross bar; and wherein said base and said clamp elements cooperatively form at least one of an oval shaped aperture, a modified oval shaped aperture, and a circular shaped aperture.

16. The clamp of claim 15, further comprising a resilient pad secured to an inner surface of said base portion.

* * * * *

UNITED STATES PATENT AND TRADEMARK OFFICE
CERTIFICATE OF CORRECTION

| | |
|---|---|
| PATENT NO. | : 6,793,186 B2 |
| APPLICATION NO. | : 10/259205 |
| DATED | : September 21, 2004 |
| INVENTOR(S) | : Pedersen |

It is certified that error appears in the above-identified patent and that said Letters Patent is hereby corrected as shown below:

Col., 6, line 47, claim 5, (amendment dated 1/27/04, page 3, line 5, claim 5,) add --be-- after "can".

Col. 6, lines 60-63, claim 8, (Examiner's amendment dated 3/20/04, page 3, line 3, claim 8,) delete claim 8 in its entirety.

Col. 8, lines 1-4, claim 14, page 3, line 3, (Examiner's amendment dated 3/20/04, page 3, line 3, original claim 17, now claim 14 in issued patent) delete original claim 17 in its entirety.

Signed and Sealed this

Nineteenth Day of September, 2006

JON W. DUDAS
*Director of the United States Patent and Trademark Office*